(12) United States Patent
Waim et al.

(10) Patent No.: US 12,145,436 B2
(45) Date of Patent: Nov. 19, 2024

(54) PLUG-IN SHAFT ARRANGEMENT AND HUB-REDUCTION AXLE FOR A MOTOR VEHICLE

(71) Applicant: ZF Friedrichshafen AG, Friedrichshafen (DE)

(72) Inventors: Thomas Waim, Grafenau (DE); Stefan Renner, Bodman-Ludwigshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/048,943

(22) Filed: Oct. 24, 2022

(65) Prior Publication Data

US 2023/0134790 A1    May 4, 2023

(30) Foreign Application Priority Data

Nov. 2, 2021    (DE) .................... 10 2021 212 294.9

(51) Int. Cl.
*B60K 17/04*    (2006.01)
(52) U.S. Cl.
CPC .................................. *B60K 17/046* (2013.01)
(58) Field of Classification Search
None
See application file for complete search history.

(56) References Cited

U.S. PATENT DOCUMENTS

| 2,905,006 A | 9/1959 | Wagner |
| 9,976,332 B2 * | 5/2018 | Scheuring ................. F16D 7/06 |

FOREIGN PATENT DOCUMENTS

| DE | 43 29 404 A1 | 3/1995 |
| DE | 196 31 479 A1 | 2/1998 |
| DE | 10 2015 213 731 A1 | 1/2017 |
| DE | 10 2020 200 888 A1 | 5/2021 |
| EP | 3 023 630 A1 | 5/2016 |
| WO | 2021/151591 A1 | 8/2021 |

OTHER PUBLICATIONS

German Patent Office, Search Report issued in German patent application No. 10 2021 212 294.9 (Jul. 7, 2022).

* cited by examiner

*Primary Examiner* — Vicky A Johnson
(74) *Attorney, Agent, or Firm* — Finch & Maloney PLLC

(57) ABSTRACT

A stub shaft assembly for an outer planetary axle (1) of a motor vehicle includes an inner shaft (9) and an outer shaft (10) comprising a helically toothed sun gear (4). A pair of toothings (11) with a first helical toothing and a second helical toothing is effective between the inner shaft (9) and the outer shaft (10). Also disclosed is an outer planetary axle (1) for a motor vehicle comprising at least one such stub shaft assembly.

12 Claims, 1 Drawing Sheet

PLUG-IN SHAFT ARRANGEMENT AND HUB-REDUCTION AXLE FOR A MOTOR VEHICLE

RELATED APPLICATIONS

This application claims the benefit of and right of priority under 35 U.S.C. § 119 to German Patent Application no. 10 2021 212 294.9, filed on 2 Nov. 2021, the contents of which are incorporated herein by reference in its entirety.

FIELD OF THE DISCLOSURE

The invention relates to a stub shaft assembly for an outer planetary axle of a motor vehicle. The invention also relates to an outer planetary axle for a motor vehicle.

BACKGROUND

The document DE 196 31 479 A1 relates to an outer planetary axle for motor vehicles comprising a differential gear connected to a vehicle drive and planetary gear trains which are disposed on wheel hubs and are driven by said differential gear via stub shafts. To technically and economically optimize the production of the outer planetary axle and also improve its noise characteristics, the document DE 196 31 479 A1 proposes that the planetary gear trains comprise helically toothed sun gears having oppositely directed helical directions and that the axial support of the sun gears on the wheel hub side be provided by bearings supported on wheel hubs and on the differential gear side by stub shafts connected to the sun gears and supported in the central region of the differential gear. Axial loads on the stub shafts directed toward the center of the differential gear are supported on both sides of an internal differential spider. Axial loads on the stub shafts directed toward the wheels are supported axially against respective bearing rings of the wheel hubs via bearings disposed on the vehicle exterior side of the end faces of the sun gear.

SUMMARY

The underlying object of the invention is to structurally and/or functionally improve an aforementioned stub shaft assembly. The underlying object of the invention is also to structurally and/or functionally improve an aforementioned axle.

The object is achieved with a stub shaft assembly having the features of Claim 1. The object is further achieved with an axle having the features of Claim 8. Advantageous embodiments and/or further developments are the subject matter of the sub-claims.

The stub shaft assembly can comprise a stub shaft. The stub shaft assembly and/or the stub shaft can be configured to produce a drive connection between a differential gear and a vehicle wheel and/or a planetary gear train on the vehicle wheel side. The inner shaft and the outer shaft can be disposed coaxially with one another. The inner shaft and the outer shaft can be drive-connected to one another. In the present case, "drive connection" or "drive-connected" refers in particular to a connection which is configured to transmit driving forces, in particular travel driving forces. The outer shaft can be disposed on the vehicle wheel side. The inner shaft can be disposed on the differential gear side.

The inner shaft can comprise a shaft axle, a first axial end, and a second axial end. The outer shaft can comprise a shaft axle, a first axial end, and a second axial end. Unless stated otherwise, or nothing to the contrary emerges from the context, "axial", "radial", and "in peripheral direction" refer to an extension direction of the shaft axle. "Axial" then corresponds to an extension direction of the shaft axle. "Radial" is then a direction which is perpendicular to the extension direction of the shaft axle and intersects the shaft axle. "In peripheral direction" then corresponds to the direction of an arc around the shaft axle.

The second end of the inner shaft and the first end of the outer shaft can be drive-connected to one another. The inner shaft can be drive-connected to the outer shaft with its second end. The outer shaft can be drive-connected to the inner shaft with its first end. The sun gear can comprise an outer toothing. The sun gear can be disposed on the second end of the outer shaft. The outer shaft and the sun gear can be drive-connected to one another.

The first helical toothing can be implemented as a gear. The first helical toothing can be disposed on the inner shaft. The first helical toothing can be disposed on the second end of the inner shaft. The second helical toothing can be implemented as a gear. The second helical toothing can be disposed on the outer shaft. The second helical toothing can be disposed on the first end of the outer shaft.

The first helical toothing can be implemented as an outer toothing. The second helical toothing can be implemented as an inner toothing. The first helical toothing can be implemented as an inner toothing. The second helical toothing can be implemented as an outer toothing.

The first helical toothing and/or the second helical toothing on the one hand and a toothing of the sun gear on the other hand can have the same helix directions. The first helical toothing and/or the second helical toothing on the one hand, and a toothing of the sun gear on the other hand, can be right-handed. The first helical toothing and/or the second helical toothing on the one hand, and a toothing of the sun gear on the other hand, can be left-handed.

The first helical toothing and/or the second helical toothing on the one hand, and the toothing of the sun gear on the other hand, can have such helix angles that at least approximately the same axial displacements can be effected on the first helical toothing and/or on the second helical toothing on the one hand, and on the toothing of the sun gear on the other hand, when the outer shaft rotates about the shaft axle relative to the inner shaft and the planetary gears. The first helical toothing and/or the second helical toothing on the one hand, and the toothing of the sun gear on the other hand, can have helix angles which comprise at least approximately the same slopes.

A releasable axial securing means can be effective between the inner shaft and the outer shaft. The axial securing means can comprise a resiliently releasable securing element. The securing element can be deformable/displaceable between a blocking shape/position and a release shape/position. The securing element can be deformable/displaceable from a blocking shape/position into a release shape/position against a spring force. The securing element can be implemented as a securing ring. The securing element can be implemented as a securing ring for shafts. The inner shaft and/or the outer shaft can comprise a groove for the securing element, in particular the securing ring. The groove can be implemented as a rectangular groove.

The axial securing means can comprise a ramp element for releasing the securing element. The ramp element can be axially displaceable. The ramp element can be configured to release the securing element, in particular the securing ring, when it is axially displaced. The ramp element can be configured to bring about a radial deformation/displacement of the securing element, in particular the securing ring, when it is axially displaced from the blocking shape/position to the release shape/position. The ramp element can be disposed on a groove for the securing element, in particular the securing ring. The groove can be beveled. The groove can be beveled on the differential gear side.

The outer planetary axle can be implemented as a rigid axle. The motor vehicle can be a truck, a bus, a construction machine, or an agricultural machine. The at least one stub shaft assembly can be disposed between the differential gear and the at least one planetary gear train. The axle can comprise two stub shaft assemblies. The stub shaft assemblies can respectively be disposed between the differential gear and the planetary gear train.

The axle can include a differential gear. The differential gear can also be referred to as an axle transmission or a transfer case. The axle can comprise ends which are assigned to vehicle wheels. The differential gear can be disposed centrally on the axle.

The axle can comprise at least one planetary gear train. The axle can comprise two planetary gear trains. The planetary gear trains can be disposed on the ends of the axle. The at least one planetary gear train can be helically toothed. The at least one planetary gear train can comprise a sun gear, planetary gears, a planet carrier, and a ring gear. The sun gear and planetary gears can comprise outer toothings. The ring gear can comprise an inner toothing. The axle can comprise at least one vehicle wheel hub. The at least one vehicle wheel hub can be disposed on the planet carrier. The at least one planetary gear train can be operable in a two-shaft operation. The at least one planetary gear train can be operable with a circulating transmission ratio. The at least one planetary gear train can be operable with a fixed ring gear. The at least one planetary gear train can be operable with input and output via the sun gear and the planet carrier. The at least one planetary gear train can be configured for a speed reducing ratio.

The toothing of the sun gear and the toothings of the planetary gears can have different helix directions. The toothing of the sun gear can be right-handed and the toothings of the planetary gears can be left-handed. The toothing of the sun gear can be left-handed and the toothings of the planetary gears can be right-handed.

The pair of toothings between the inner shaft and the outer shaft and a pair of toothings between the sun gear and the planetary gears can be configured such that an axial load of the pair of toothings between the inner shaft and the outer shaft and an axial load of a pair of toothings between the sun gear and the planetary gears are coaxially directed toward one another or away from one another. The pair of toothings between the inner shaft and the outer shaft and a pair of toothings between the sun gear and the planetary gears can be configured such that an axial load of the pair of toothings between the inner shaft and the outer shaft and an axial load of a pair of toothings between the sun gear and the planetary gears at least approximately offset one another. The pair of toothings between the inner shaft and the outer shaft and a pair of toothings between the sun gear and the planetary gears can be configured such that a resultant of an axial load of the pair of toothings between the inner shaft and the outer shaft and an axial load of a pair of toothings between the sun gear and the planetary gears is at least approximately zero.

In summary and presented in other words, the invention thus results, among other things, in a stub shaft on the outer planet which is axially load-free toward the outside. The connection point of the outer and the inner stub shaft can be helically toothed, namely with a helix angle which preferably has the same or a similar slope as the toothing of the sun toothing in the outer planet. This allows the axial loads at the connection point and the running teeth to cancel or nearly cancel one another out. The two-part shaft can then behave like a one-part shaft with respect to axial forces and axial support can be dispensed with. Since small deviations can occur as a result of tolerances, and to realize a defined position of the shaft relative to the drive, a device for axial fixing can be provided as well. This fixing can be implemented, among other things, with a snap ring, for example. Said snap ring can be displaceable over an incline with a defined force to disassemble the outer shaft. Due to the similar slope of the two toothings, the outer stub shaft can be pulled out (rotated) without having to jack up the rear axle.

The invention reduces expenditure, such as in terms of cost, use of installation space, maintenance, disassembly and/or towing. Losses, in particular as a result of bearing friction, are reduced. Efficiency is increased. The need for lubrication is reduced. Disassembly of a stub shaft is simplified. There is no need to jack up an axle.

BRIEF DESCRIPTION OF THE DRAWINGS

A design example of the invention is described in more detail in the following with reference to figures. The figures schematically and by way of example show.

DETAILED DESCRIPTION

Figure 1:
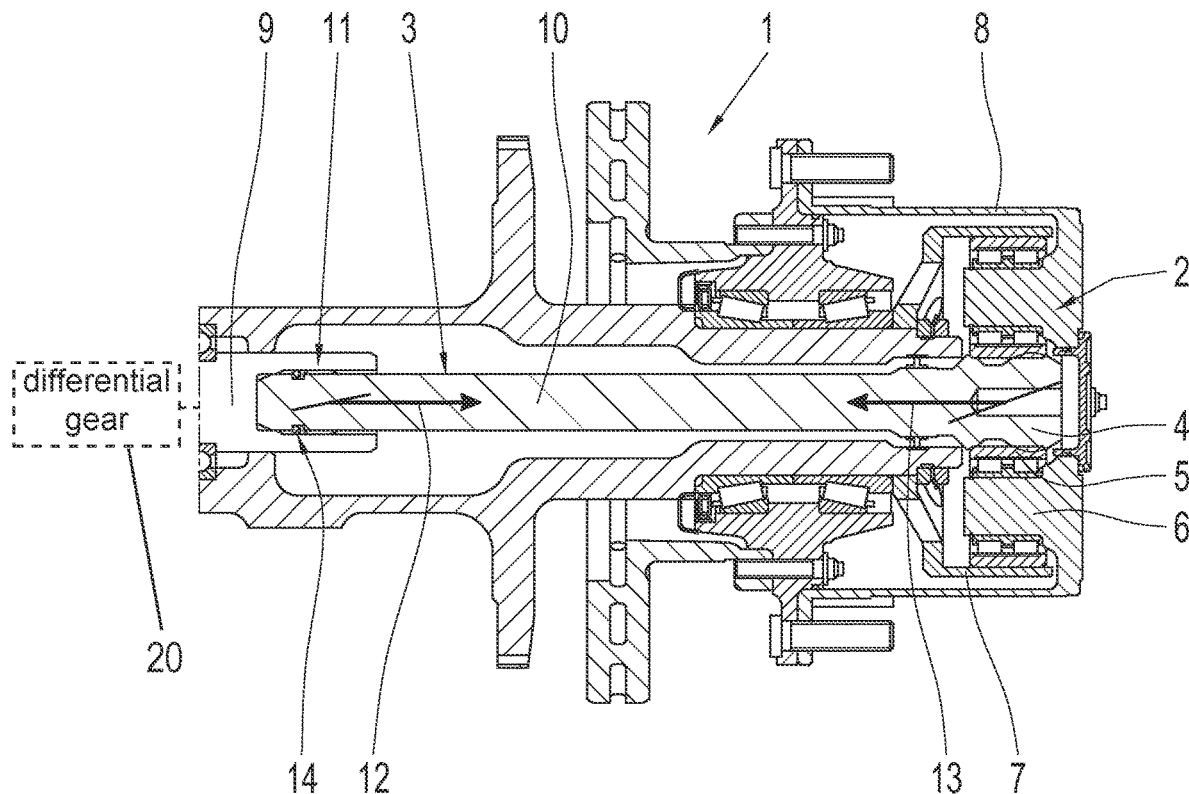
FIG. 1: an outer planetary axle comprising a split axial load-free stub shaft

FIG. 1 shows a section of an outer planetary axle 1. The outer planetary axle 1 comprises a differential gear 20 (diagrammatically shown in FIG. 1), two planetary gear trains, such as the planetary gear train 2, and a split stub shaft, such as the stub shaft 3, disposed between the differential gear 20 and the planetary gear train 2.

The planetary gear train 2 is and comprises a helically toothed sun gear 4, helically toothed planetary gears, such as the planetary gear 5, a planet carrier 6 and a fixed helically toothed ring gear 7. The planet carrier 6 forms a vehicle wheel hub 8 for receiving a vehicle wheel. The sun gear 4 is drive-connected to the stub shaft 3. The drive of the vehicle wheel is provided from the differential gear over the stub shaft 3, the sun gear 4, the planetary gear trains 5, the planet carrier 6 and the vehicle wheel hub 8.

The stub shaft 3 is split and comprises an inner shaft 9 and an outer shaft 10. A pair of toothings 11 comprising an inner helical toothing disposed on the inner shaft 9 and an outer helical toothing disposed on the outer shaft 10 is effective between the inner shaft 9 and the outer shaft 10.

The pair of toothings 11 and the helically toothed sun gear 4 have the same helix directions and helix angles which comprise the same slopes, so that an axial load 12 of the pair of toothings 11 and an axial load 13 of the pair of toothings between the sun gear 4 and the planetary gears 5 offset one another. Furthermore, when the outer shaft 10 rotates about the shaft axle 12 relative to the inner shaft 9 and the planetary gears 5, the same axial displacements occur at the pair of toothings 11 and at the sun gear 4, so that the outer shaft 10 can be axially disassembled.

Figure 2:
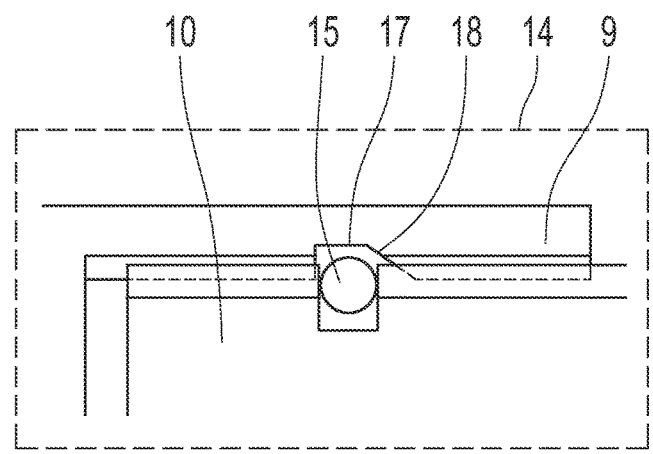
FIG. 2: a releasable axial securing means of a split axial load-free stub shaft.

A releasable axial securing means 14, which is shown in detail in FIG. 2, is effective between the inner shaft 9 and the outer shaft 10. The axial securing means 14 comprises a securing element 15 implemented as a locking spring ring, which is received in an axially form-locking manner in a groove 16 on the inner shaft 9 on the one hand and in a groove 17 on the outer shaft 10 on the other hand. The groove 17 is beveled on one side, whereby the beveled flank of the groove 17 serves as a ramp element 18, so that, when the outer shaft 10 is axially displaced, the securing element 15 is deformed radially against a spring force and the axial securing means 14 is released.

The word "can" refers in particular to optional features of the invention. There are therefore also further developments and/or design examples of the invention which additionally or alternatively comprise the respective feature or features.

If necessary, isolated features can also be selected from the combinations of features disclosed here and can be used in combination with other features to delimit the subject matter of the claim, while resolving a structural and/or functional relationship that may exist between the features.

LIST OF REFERENCE NUMERALS

1 Outer planetary axle
2 Planetary gear train
3 Stub shaft
4 Sun gear
5 Planetary gear
6 Planet carrier
7 Ring gear
8 Vehicle wheel hub
9 Inner shaft
10 Outer shaft
11 Pair of toothings
12 Axial load
13 Axial load
14 Axial securing means
15 Securing element
16 Groove
17 Groove
18 Ramp element

The invention claimed is:

1. A stub shaft assembly for an outer planetary axle of a motor vehicle, comprising:
an inner shaft;
an outer shaft comprising a helically toothed sun gear;
a pair of toothings comprising a first helical toothing and a second helical toothing between the inner shaft and the outer shaft;
the first helical toothing is implemented as an outer toothing and the second helical toothing is implemented as an inner toothing; and
the helically toothed sun gear has a helix direction that is the same as a helix direction of the first helical toothing and/or a helix direction of the second helical toothing.

2. The stub shaft assembly according to claim 1, characterized in that a helix angle of the first helical toothing and/or a helix angle of the second helical toothing is at least approximately equal in slope to a helix angle of toothing of the sun gear.

3. The stub shaft assembly according to claim 2, comprising a releasable axial securing means between the inner shaft and the outer shaft.

4. The stub shaft assembly according to claim 3, wherein the releasable axial securing means comprises a resiliently releasable securing element.

5. The stub shaft assembly according to claim 4, wherein the axial securing means comprises a ramp element for releasing the releasable securing element.

6. An outer planetary axle for a motor vehicle, wherein the axle comprises at least one stub shaft assembly according to claim 1.

7. The axle according to claim 6, wherein the axle includes a differential gear and at least one helically toothed planetary gear train comprising a sun gear, planetary gears, a planet carrier, and a ring gear, wherein the at least one stub shaft assembly is between the differential gear and the at least one planetary gear train.

8. The axle according to claim 7, wherein the pair of toothings between the inner shaft and the outer shaft, and a pair of toothings between the sun gear and the planetary gears, are configured such that an axial load of the pair of toothings between the inner shaft and the outer shaft and such that an axial load of a pair of toothings between the sun gear and the planetary gears at least approximately offset one another.

9. A stub shaft assembly for an outer planetary axle of a motor vehicle, comprising:
an inner shaft;
an outer shaft comprising a helically toothed sun gear;
a pair of toothings comprising a first helical toothing and a second helical toothing between the inner shaft and the outer shaft;
the first helical toothing is implemented as an outer toothing and the second helical toothing is implemented as an inner toothing;
the helically toothed sun gear has a helix direction that is the same as a helix direction of the first helical toothing and/or a helix direction of the second helical toothing; and
a releasable axial securing means between the inner shaft and the outer shaft.

10. The stub shaft assembly according to claim 9, wherein the releasable axial securing means comprises a resiliently releasable securing element.

11. The stub shaft assembly according to claim 10, wherein the axial securing means comprises a ramp element for releasing the releasable securing element.

12. The stub shaft assembly according to claim 9, wherein the pair of toothings between the inner shaft and the outer shaft are configured such that an axial load of the pair of toothings between the inner shaft and the outer shaft at least approximately offset one another.

* * * * *